ALBIN WARTH.

Stop Valve for Petroleum Packages.

No. 4,852. Reissued April 2, 1872

Witnesses.
C. Wahlers.
E. F. Kastenhuber

Inventor
Albin Warth
per
Van Santvoord & Reid
Attys

BEST AVAILABLE COPY 4,852

UNITED STATES PATENT OFFICE.

ALBIN WARTH, OF STAPLETON, NEW YORK.

IMPROVEMENT IN STOP-VALVES FOR PETROLEUM PACKAGES.

Specification forming part of Letters Patent No. 102,187, dated April 19, 1870; reissue No. 4,852, dated April 2, 1872.

*To all whom it may concern:*

Be it known that I, ALBIN WARTH, of Stapleton, in the county of Richmond and State of New York, have invented a new and useful Improvement in Stop-Valves for Liquid Packages; and I do hereby declare the following to be a full, clear, and exact description thereof, which will enable those skilled in the art to make and use the same, reference being had to the accompanying drawing forming part of this specification, in which drawing—

Figure 1:
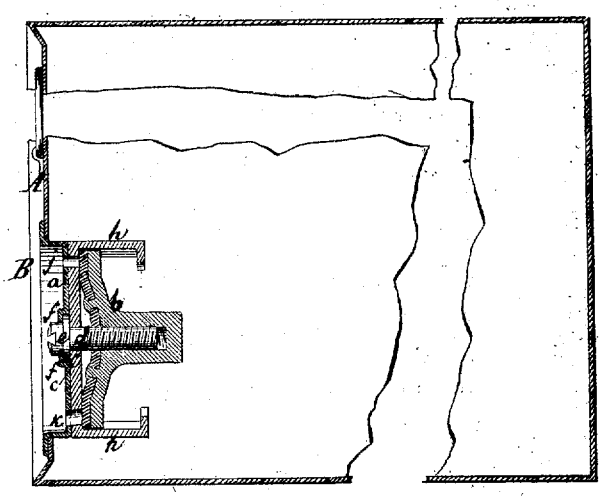
Figure 3:
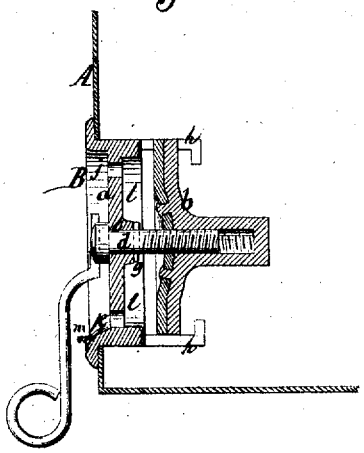
Figure 2:
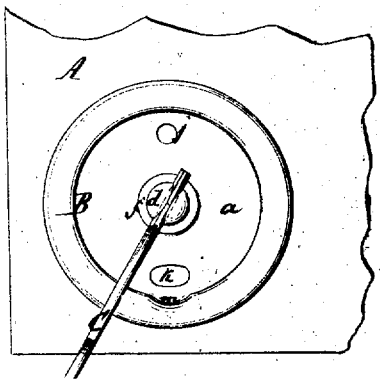
Figure 4:
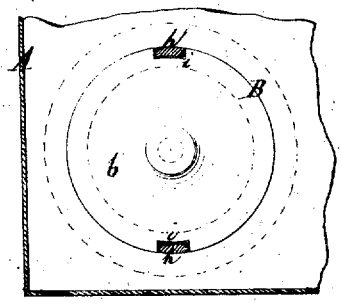

Figure 1 represents a vertical section of this invention when the valve is drawn up to its seat. Fig. 2 is a plan or top view of the same. Fig. 3 is a section of a modification of the same, showing the valve removed from its seat. Fig. 4 is an inverted plan of the same.

Similar letters indicate corresponding parts.

This invention consists in a stop-valve, composed of a disk or plate having a valve-seat on its inner side, and provided with a rim projecting beyond said valve-seat for the purpose of attaching it to the side of a case or package, and with a hole, through which passes a screw that serves to draw the valve up to its seat. The disk or plate is provided with a vent-hole and a discharge-opening, so that, when the valve is removed from its seat, the contents of the package flow freely from the discharge-opening, while the external air passes into the package through the vent-hole. Guides are provided to prevent the valve from turning when the valve is operated. When said disk or plate is secured in or on the edge of an opening provided in the package to receive it, and the valve is drawn up to its seat, the package is hermetically sealed, and by operating the screw the valve can be readily opened and the contents of the package, or any portion thereof, can be conveniently drawn off. The apparatus is also provided with a receiving-chamber, shown in Fig. 3 of the drawing, situated between the valve-seat and the vent-hole and discharge-opening in such a manner that, when the valve is opened, the liquid on its way from the package to the discharge-opening spreads in said chamber, whereby the influx of the air through the vent-hole is facilitated and the bubbling of the liquid in discharging is materially reduced or entirely avoided.

In the drawing, the letter A designates a case or package, made of tinned sheet-iron or any other suitable material, and capable of containing petroleum or other liquids, particularly such as are intended for transportation. In one side of this package is secured a stop-valve, B, which consists of a disk or plate, *a*, the inner surface of which forms the seat for the valve *b*, a portion of said plate being made to extend beyond the valve-seat, so that the apparatus can be conveniently secured in or on an opening provided for this purpose in one of the sides of the package. This can be done by soldering. In the valve-plate *a* is made a hole, *c*, to admit a screw, *d*, which serves to draw the valve *b* up against its seat. This screw may be tapped into the body of the valve, and in this case its head is provided with a collar, *e*, (see Fig. 1,) and the valve-plate is furnished with an annular lip, *f*, catching over said collar so as to confine the head in position and to enable the screw to impart to the valve a positive motion in either direction. The same result is produced by passing through the shank of the screw a pin, *g*, (see Fig. 3,) which bears against the inner surface of the valve-plate, while the head of the screw rests against the outer surface of said plate. From the inner edge of the valve-plate *a* project guides *h*, which catch in recesses *i* in the valve *b*, (see Fig. 4,) so that said valve is prevented from turning around by the action of the screw, and that when the screw is operated the valve is enabled to close up against its seat, or to move away therefrom, without sustaining any injury on its face or injuring the face of the valve-seat. A suitable key or wrench, C, may be used for operating the screw *d*, or it may be operated by an ordinary screw-driver. The valve-plate *a* is also provided with a vent-hole, *j*, and a discharge-opening, *k*, which openings are situated close to the circumference of the valve-seat, the apparatus being secured in the package in such a position that when said package is turned over for the purpose of drawing out some of its contents the discharge-opening is down and the vent-hole up, as shown in Figs. 1, 2, and 3 of the drawing. The liquid, after passing through the discharge-opening *k*, is guided by a channel, *m*, formed on the adjacent edge of the disk or plate. (See Figs. 2 and 3.)

Between that portion of the valve-plate which forms the seat for the valve and that portion thereof which contains the vent-hole and the discharge-opening I form, in some cases, as is illustrated in Fig. 3, a chamber, *l*, so that when the valve is opened the liquid on its way from the package to the discharge-opening has room to spread in said chamber, allowing the external air to pass in through the vent-hole with little (if any) obstruction; and by these means the bubbling of the liquid in discharging is reduced or entirely avoided and the discharge of the liquid from the package is materially facilitated.

By turning the screw in the proper direction the valve and the holes *j* and *k* are opened so that the contents of the case can be poured out through the discharge-opening *k*, the external air having free access to the interior of the case through the vent-hole *j*.

This valve is of particular value for petroleum packages, which are transported across the ocean in very large quantities, and which have to be hermetically sealed, and, at the same time, so constructed that the contents of the package can be readily drawn off. It is desirable, also, that such packages, when they are to be transported, have no projecting parts on their sides; and I have here shown how my stop-valve can be applied without producing an objectionable projection on the package, the disk or plate being made concave on the outer side to hold the head of the operating-screw.

What I claim as new, and desire to secure by Letters Patent, is—

1. A stop-valve for liquid packages, composed of a disk or plate the inner surface of which forms the valve-seat, and which is provided with a rim projecting beyond said valve-seat for the purpose of attaching it to the package, and with a hole, through which passes a screw that serves to draw up the valve against its seat, substantially in the manner herein shown and described.

2. A vent-hole and discharge-opening in the valve-plate, on which the seat of the valve is formed, and which plate is provided with a rim for attaching the apparatus to a case or package, substantially as described.

3. The guides *h*, in combination with the valve-plate, the valve, and the valve-operating screw, substantially as set forth.

4. The chamber *l*, in combination with the valve, the valve-seat, the vent-hole, and the discharge-opening in the valve-supporting plate, substantially as herein described.

ALBIN WARTH.

Witnesses:
W. HAUFF,
E. F. KASTENHUBER.